US010952123B1

(12) United States Patent
Russell et al.

(10) Patent No.: US 10,952,123 B1
(45) Date of Patent: Mar. 16, 2021

(54) ULTRA-HIGH RELIABILITY WIRELESS COMMUNICATION SYSTEMS AND METHODS

(71) Applicant: Sandia Corporation, Albuquerque, NM (US)

(72) Inventors: John L. Russell, Albuquerque, NM (US); David A. Wiegandt, Albuquerque, NM (US); Dahlon D. Chu, Albuquerque, NM (US); Kevin Robbins, Albuquerque, NM (US); Douglas G. Brown, Cedar Crest, NM (US); Dominic A. Perea, Albuquerque, NM (US); Loren E. Riblett, Jr., Edgewood, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 128 days.

(21) Appl. No.: 15/222,699

(22) Filed: Jul. 28, 2016

Related U.S. Application Data

(60) Provisional application No. 62/197,860, filed on Jul. 28, 2015.

(51) Int. Cl.
*H04J 3/14* (2006.01)
*H04W 40/16* (2009.01)
*H04W 48/18* (2009.01)
*H04L 12/721* (2013.01)
*H04W 4/02* (2018.01)
*H04W 84/18* (2009.01)

(52) U.S. Cl.
CPC ............. *H04W 40/16* (2013.01); *H04L 45/12* (2013.01); *H04W 4/02* (2013.01); *H04W 48/18* (2013.01); *H04W 84/18* (2013.01)

(58) Field of Classification Search
CPC ....... H04W 40/16; H04W 4/02; H04W 48/18; H04W 84/18; H04L 45/12
USPC ................................................. 370/230, 229
See application file for complete search history.

(56) References Cited

U.S. PATENT DOCUMENTS

| | | | | |
|---|---|---|---|---|
| 2002/0103877 A1* | 8/2002 | Gagnon | ............ | H04W 12/0609 709/217 |
| 2010/0246480 A1* | 9/2010 | Aggarwal | ............. | H04L 45/123 370/328 |
| 2011/0164518 A1* | 7/2011 | Daraiseh | ............... | H04L 45/121 370/252 |
| 2013/0107726 A1* | 5/2013 | Hughes | ................. | H04L 45/122 370/252 |
| 2013/0273839 A1* | 10/2013 | Breshears | ............... | H04L 45/44 455/11.1 |

(Continued)

OTHER PUBLICATIONS

Schotten, H.D., et al., "Available Indication as Key Enabler for Ultra-Reliable Communication in 5G", European Conference on Networks and Communications, 2014, 5 pages, Bologna.*

*Primary Examiner* — Chuong T Ho
(74) *Attorney, Agent, or Firm* — Daniel J. Jenkins

(57) ABSTRACT

Systems and methods for ultra-high reliability (UHR) wireless communications systems and methods are disclosed. The disclosed UHR wireless communications systems and methods make the networked components on a communications infrastructure robust to interference caused by unintentional jamming, intermittent connectivity, weather, and physical barriers.

14 Claims, 1 Drawing Sheet

(56) References Cited

U.S. PATENT DOCUMENTS

| | | | |
|---|---|---|---|
| 2013/0329648 A1* | 12/2013 | Lord | H04L 45/02 370/329 |
| 2014/0016468 A1* | 1/2014 | Daraiseh | H04L 45/121 370/235 |
| 2014/0100781 A1* | 4/2014 | Venkatraman | G01C 21/20 701/537 |
| 2014/0129735 A1* | 5/2014 | Thyni | H04L 45/14 709/241 |
| 2015/0180779 A1* | 6/2015 | Geetha Gopalakrishnan | H04L 43/0882 370/235 |
| 2015/0365792 A1* | 12/2015 | Manges | G06F 3/1454 455/457 |
| 2017/0032670 A1* | 2/2017 | Poornachandran | G08G 1/096775 |

* cited by examiner

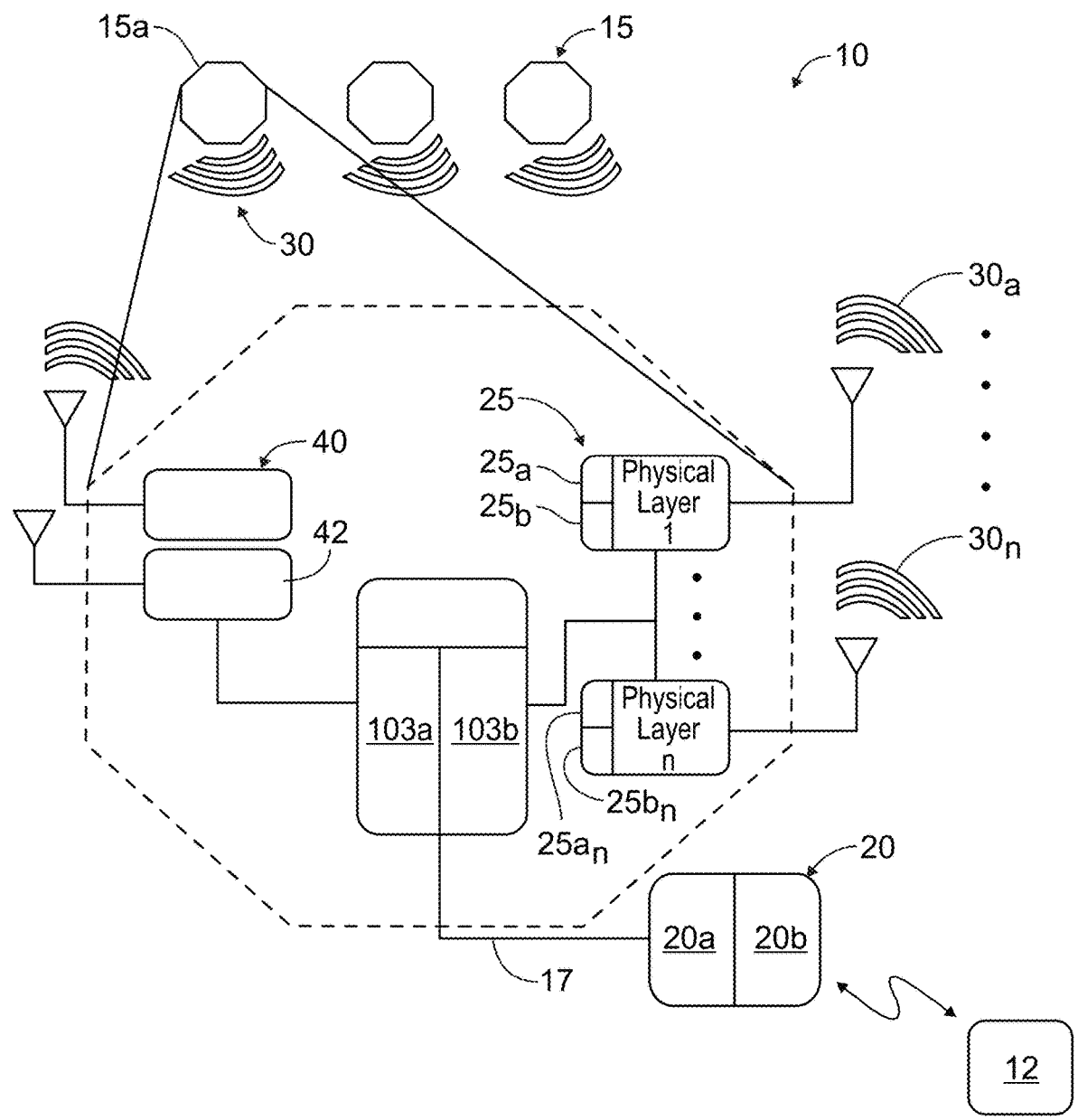

ULTRA-HIGH RELIABILITY WIRELESS COMMUNICATION SYSTEMS AND METHODS

CROSS-REFERENCE TO RELATED APPLICATIONS

This application claims priority to U.S. Provisional Patent Application No. 62/197,860, filed on Jul. 28, 2015, entitled "ULTRA-HIGH RELIABILITY WIRELESS COMMUNICATION SYSTEMS AND METHODS", the entirety of which is incorporated herein by reference.

GOVERNMENT RIGHTS

The Government has rights to this invention pursuant to Contract No. DE-AC04-94AL85000 awarded by the U.S. Department of Energy.

FIELD

The invention relates generally to wireless networking, and more particularly to ultra-high reliability wireless communication systems and methods that use multiple physical layers to ensure robust data throughput.

BACKGROUND OF THE INVENTION

The wireless environment is dynamic and unpredictable with complications due to environment and weather, unintentional jamming, and even intentional jamming. Possible solutions to such complications are constrained by existing applications and networking technologies.

The need of ultra-high reliability wireless communications (comms) exists in applications such as high security applications or critical emergency operations. These applications demand reliable communications when subjected to unintentional jamming from harsh weather, commercial communications infrastructure failure or unavailability due to power outages or saturated RF environments around large groups of people with mobile RF transmitters (i.e.) phones around/in stadiums and along crowded event pathways, or poor frequency coordination and intentional jamming from malicious actors that intend to undermine high security operations or emergency activities.

A need remains, therefore, for wireless networking systems and methods that are robust to such complications and transparent to existing applications and networking technologies.

SUMMARY OF THE INVENTION

The present disclosure is directed to ultra-high reliability (UHR) wireless communications systems and methods. The disclosed UHR wireless communications systems and methods use a plurality of nodes that route communications to make the networked components on a communications infrastructure robust to interference caused by unintentional jamming, intermittent connectivity, weather, and physical barriers.

The disclosure implements a robust and secure networking topology, scalable to many nodes and applications, that actively manages multiple heterogeneous physical layers and the resources that are connected to these layers to ensure uninterrupted connectivity among nodes and applications via one or more unaffected physical layers.

According to the present disclosure, processors at each node manage data over multiple concurrent links. This robust architecture eliminates data dropout due to a single or multiple link failure. The system employs a physical layer agnostic architecture allowing for any type of communication system to be integrated horizontally into the robust architecture. The communication system to be integrated into one or more of the nodes may include, but are not limited to radio frequency (RF) communications across multiple frequency bands, optical communications, and acoustic systems, and combinations thereof. These examples do not preclude the inclusion of other phenomenologies used as a physical layer for communications In an embodiment of the disclosure, a communications system is disclosed that includes two or more communication nodes in communication with one another, at least one information source providing information to at least one of the two or more communication nodes, and at least one client network in communication with at least one node of the two or more nodes. The two or more nodes comprise a processor configured to select one or more communication devices to communicate information received from the at least one information source based on a determination of the reliability of communications between the two or more nodes In another embodiment of the disclosure, a communications method is disclosed that includes receiving information into one or more communication nodes, determining at the receiving node the most reliable communication path passing through at least one additional node of the one or more communication nodes to a client network, transmitting the information from the one or more nodes having received the information through the most reliable communication path, and receiving the information at the client network. In addition, the communication pathway between the nodes may be selected based on energy efficiency, latency, and other measures and metrics relevant to a particular transmission parameter.

One advantage of the present disclosure is providing robust communication systems and methods.

Additional advantages of the present disclosure include, but are not limited to:
a. backwards compatibility with existing networking technologies and applications,
b. support for layer 2 (e.g. Ethernet radios) and layer 3 (e.g. IP packet radios) physical layers,
c. support for transparently upgrading physical layers after initial deployment and service,
d. support for both fixed and mobile ad-hoc network deployments, support for satellite communications both for remote command and status of communication nodes and for communication among nodes.

BRIEF DESCRIPTION OF THE FIGURES

FIG. 1 illustrates an example of a communications system according to an embodiment of the disclosure.

DETAILED DESCRIPTION OF THE INVENTION

The present disclosure is directed to ultra-high reliability (UHR) wireless communications systems and methods that use a plurality of nodes that route communications to make the networked components on a communications infrastructure robust to interference caused by unintentional jamming, intermittent connectivity, weather, and physical barriers.

FIG. 1 illustrates an example of an UHR wireless communications system (system) 10 according to an embodiment of the disclosure. The system 10 is used to communicate information or data, referred to herein as information, to a client network or user. As can be seen in FIG. 1, the system 10 includes nodes 15 and an application 20. The nodes 15 provide for selective routing of the information between the nodes 15 and the application 20. In this exemplary embodiment, the system 10 includes three nodes 15a, however, in other embodiments, the system 10 may include two or more nodes. In other embodiments, the system 10 may have 10 or more nodes. It is appreciated that the number of nodes is scalable and upwardly limited only by the limitations of the integrated physical layers. In this exemplary embodiment, the nodes 15 are geographically fixed or stationary. In other embodiments, the nodes 15 may be stationary or mobile. For example, mobile nodes may be located on mobile platforms, such as, but not limited to vehicles, individuals, or unmanned vehicles.

The application 20 includes an information source 20a and a client network 20b. The information source 20a provides information to node 15a. The information source 20a may be, but is not limited to, sensor(s), cameras, command and control applications, voice communication sources, Private Branch Exchange (PBX) for telephony, and short message service (SMS) for texts. This list is not exhaustive and is simply representative of applications that can be used. The information source can by any type of digital data. For example, the sensor may be, but is not limited to cameras imaging systems, and acoustic systems. The client network 20b receives information from the nodes 15a that is provided to a user. The client network 20b may interface or communicate with, be connected to, or be linked to the node 15a by one or more fixed or mobile computer devices (devices) over a communication link (link) 17. The computer devices may be, but are not limited to, computer processors, laptops, mobile phones, computer tablets, managed switch networks or other networking devices. The link 17 may be a wireless and/or wired connection. In an embodiment, the client network 20b may be locally connected to and/or co-located with the nodes 15. In an embodiment, the link 17 may be a wireless connection such as, but is not limited to WIFI, Bluetooth, and/or broadband wireless. In an embodiment, the link 17 may be a wired connection, such as, but not limited to Ethernet. In an embodiment, the client network 20b may provide the communicated information received from the node 15a over link 17, in original or processed format, to an external user 12. For example, the external user 12 may be, but is not limited to, an alarm monitoring station or an emergency operations center.

In other embodiments, the application 20 may not be linked to a node, and the node may be used solely as an information routing node between nodes. In other embodiments, the application 20 may not include the information source 20a or client network 20b, thereby serving as either an information receiver or information provider, respectively.

In this exemplary embodiment, the application 20 is linked only to node 15a. In other embodiments, application 20 may be linked to one or more of nodes 15. In yet other embodiments, one or more applications 20 may be linked to one or more of nodes 15. In yet other embodiments, one or more nodes of nodes 15 may be connected to one or more other and/or the same applications, with applications communicating among themselves. In an embodiment, application 20 may communicate to another application over the node communications network, over a communications link independent of the node communications network, or combinations thereof.

FIG. 1 also illustrates a more detailed view of node 15a. As can be seen in FIG. 1, node 15a includes a node command module 103 that includes a processor 103a and a network switching layer 103b. The processor 103a actively manages a plurality (1-n) of communication physical layers 25 (physical layers) to robustly communicate among the plurality of nodes 15 even in the presence of jamming, whether intentional or unintentional. The processor 103 actively manages the physical layers 25 by selecting one or more of the physical layers 25 to communicate information to or from that node. In an embodiment, the processor 103a may use a GNU/Linux operating system. In another embodiment, the processor 103a may use another operating system, such as, but not limited to Windows, OS X, and FreeBSD. As can be appreciated, the architecture is not limited to any number of physical n layers, but can transparently manage as many physical layers as are needed for a given application. The physical layers 25 communicate over communication pathways 30A through 30n.

The processor 103a uses out-of-band (OOB) information to determine to which node, if necessary, information is communicated to reach the application 20 in the most reliable and efficient pathway or route. As used herein, the term "reliable" means maintaining the ability to communicate despite environmental challenges such as, but not limited to, weather fading, unintentional jamming, and intentional jamming. In another embodiment, the processor 103a may use and/or include energy efficiency, latency, and other measures and metrics relevant to the communications parameters to determine the pathway. In such a manner, by using a plurality of nodes, the system 10 can determine or ascertain the most reliable route to communicate the information. The OOB information is determined by and/or available to the processor 103 during operations by analyzing communications or by using predetermined communications parameters.

OOB determined information can include, but is not limited to received signal strength indication (RSSI), link quality, visible nodes, and data rates. In an embodiment, the processor 30a determine OOB determined information by sampling communications or by sending test communications packets and analyzing the communication. OOB available information can include, but is not limited to routing tables, routing metrics, and default window size for transmission control protocol (TCP) connections over routes, that are available to the processor 30a via processor memory. The processor 103a uses an algorithm that provides for the execution of computer executable instructions to select the communications route and physical layer.

The switching layer 20b receives instructions from the processor 30a as to which one or more physical layers 25 to select for communications. The switching layer 20b implements the separation of the various physical layers, each of which realizes a network segment, and ensures communications from the processor 30a are transmitted on the desired physical layers. The switching layer 20b may be implemented by various means including, but not limited to, (a) a discrete VLAN switch connected to the processor 30a by a single physical network interface and (b) multiple physical network interfaces directly integrated to the processor 30a.

The physical layers 25 are communications systems that allow for node-to-node communications. The communications systems may be, but are not limited to radio frequency (RF) communications across multiple frequency bands, optical communications, and acoustic systems, and combinations thereof. The physical layers 25 form a "coded network" and may include a link layer device(s) 25a and/or network layer device(s) 25b. Link layer devices 25a implement a single network segment for all participating comm devices. In an embodiment, the link layer devices 25a may be, but are not limited to Ethernet radios. In an embodiment, the link layer radio may be an Ethernet radio, such as, but not limited to an AvaLAN radio or the Torrey Pines Logic IR Optical radio. Network layer devices 25b permit the use of routing packets between separate networks. The network layer devices 25b may be, but are not limited to, IP packet radios such as, but not limited to, a Motorola MOTO Mesh radio.

Node 15a may further include a management interface system 40 to provide additional information or access to the processor 103. The management interface system 40 provides access to the processor of the node to configure, upgrade, command, or query a node. For example, access can be sued to provide diagnostic access and/or monitoring of the system 10, and/or to provide updates to the processor 103a. In this exemplary embodiment, the management interface system 40 is a wireless physical layer, permitting the node to be located where direct physical access is inconvenient or impossible. In an embodiment, the wireless physical layer may be a radio. In an embodiment, the radio may be a mesh radio. In another embodiment, the radio may be a satellite modem that permits remote command and status of nodes 15 and may also provide for communication between the nodes 15. Node 15a may also further include an optional node service system 42 that may provide information to the node 15a, such as, but not limited to time synchronization, positioning, and environmental monitoring (e.g. rain gauge, and barometric pressure. In this exemplary embodiment, the optional node service system 42 is a global positioning system (GPS) providing geolocation of the node 15a and timing information to the processor 103.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. A communications system, comprising:
   three or more communication nodes in communication with one another;
   at least one information source providing information to at least one of the three or more communication nodes; and
   at least one client network in communication with at least one node of the three or more nodes;
   wherein the three or more communication nodes each comprise two or more different types of communications based wireless communication devices; and
   wherein each of the three or more nodes each comprise a processor configured to select one of the two or more wireless communication devices to communicate information received from the at least one information source based on a determination of the reliability of wireless communications between the three or more nodes; and
   wherein the three or more communication nodes are located on three or more separate corresponding mobile platforms; and
   wherein the two or more different types of communications based communications devices are different devices and are selected from a group consisting of radio frequency devices, and optical transmission devices.

2. The communications system of claim 1, wherein the information source is a sensor.

3. The communications system of claim 1, wherein the client network is selected from a group consisting of mobile communications devices, computer laptops, central processors, and computer tablets.

4. The communications system of claim 1, wherein the processor receives additional information from a management interface system.

5. The communications system of claim 1, wherein the processor receives other additional information form a node service system that provides other additional information selected from a group consisting of global positioning system location and time information.

6. The communications system of claim 1, further comprising:
   a switching layer that receives instructions from the process to select the one of the two or more different types of communications based wireless communications devices.

7. The method of claim 1, wherein the three or more separate corresponding mobile platforms are selected from the group consisting of vehicles, individuals, and unmanned vehicles.

8. A method for robust communications, comprising:
   receiving information into one or more of three or more communication nodes;
   determining at the one of more of three or more receiving nodes the most reliable communication path type from one of two or more wireless communication devices at each of the one or more of three or more receiving nodes for passing the information through at least one additional node of the three or more communication nodes to a client network;
   transmitting the information from the one or more of three or more nodes having received the information through the most reliable wireless communication path type via the one of two or more wireless communication devices; and
   receiving the information at the client network; and
   wherein the three or more communication nodes are located on three or more separate corresponding mobile platforms; and
   wherein the most reliable wireless communication path type is selected from the group consisting of radio frequency and optical communications.

9. The method of claim 8, wherein the information is generated by a sensor.

10. The method of claim 8, wherein the two or more wireless communications devices are selected from a group consisting of radio frequency radios, and optical communications devices.

11. The method of claim 8, further comprising:
    providing global positioning geographic location and time information to the one or more communication nodes.

12. The method of claim 8, further comprising:
providing additional information to the one or more wireless communication nodes, wherein the additional information is selected from a group consisting of node processor updates.

13. The method of claim 8, wherein the client network is selected from a group consisting of a computer device, mobile phone and computer laptop.

14. The method of claim 8, wherein the three or more separate corresponding mobile platforms are selected from the group consisting of vehicles, individuals, and unmanned vehicles.

\* \* \* \* \*